(12) United States Patent
Kajino

(10) Patent No.: US 12,147,894 B2
(45) Date of Patent: Nov. 19, 2024

(54) DIFFERENTIABLE TEMPORAL POINT PROCESSES FOR SPIKING NEURAL NETWORKS

(71) Applicant: INTERNATIONAL BUSINESS MACHINES CORPORATION, Armonk, NY (US)

(72) Inventor: Hiroshi Kajino, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 870 days.

(21) Appl. No.: 17/307,061

(22) Filed: May 4, 2021

(65) Prior Publication Data
US 2022/0374701 A1     Nov. 24, 2022

(51) Int. Cl.
*G06N 3/08*        (2023.01)
*G06N 3/047*     (2023.01)
(Continued)

(52) U.S. Cl.
CPC .............. *G06N 3/08* (2013.01); *G06N 3/047* (2023.01); *G06N 3/049* (2013.01); *G06N 7/01* (2023.01);
(Continued)

(58) Field of Classification Search
CPC .......... G06N 3/08; G06N 3/047; G06N 3/049; G06N 7/01; G06N 3/063; G06N 3/084; G06N 5/01; G06N 3/048
See application file for complete search history.

(56) References Cited

U.S. PATENT DOCUMENTS

2020/0019840 A1*    1/2020    Guo ..................... G06N 3/08

OTHER PUBLICATIONS

Anquetil et al., ("Wasserstein Learning of Determinantal Point-Processes" Published 2020 (10 pages), (Year: 2020).*
(Continued)

*Primary Examiner* — Quoc A Tran
(74) *Attorney, Agent, or Firm* — Tutunjian & Bitetto, P.C.; Robert Richard Aragona

(57) ABSTRACT

A method performs a Differentiable Point Process (DPP). Generate a first sample $s_k$ by sampling from a Poisson process with reference to an upper bound $\bar{\lambda}$ of a conditional intensity function representing the DPP given a first set of samples S. Determine whether $s_k > T$, output a second set of samples $\mathcal{D}$ and train a probabilistic model using $\mathcal{D}$ when $s_k > T$, and perform the next four steps (generate a second sample, add, add, update) and return to the first step (generate a first sample) when $s_k \leq T$, where T denotes an observation length. Generate a second sample $$\begin{bmatrix} p_k \\ r_k \end{bmatrix}$$

by sampling from a concrete distribution with reference to a parameter of the distribution defined by the conditional intensity function and a temperature $\tau$, given a second set of samples $\mathcal{D}$. Add a pair of $s_k$ and $p_k$ to $\mathcal{D}$ and discard $r_k$. Add $s_k$ to S. Update k to k+1.

20 Claims, 8 Drawing Sheets

(51) Int. Cl.
   *G06N 3/048* (2023.01)
   *G06N 3/049* (2023.01)
   *G06N 3/063* (2023.01)
   *G06N 3/084* (2023.01)
   *G06N 5/01* (2023.01)
   *G06N 7/01* (2023.01)

(52) U.S. Cl.
   CPC .............. *G06N 3/048* (2023.01); *G06N 3/063* (2013.01); *G06N 3/084* (2013.01); *G06N 5/01* (2023.01)

(56) References Cited

OTHER PUBLICATIONS

Ltaief et al., ("A Spiking Neural Network Model for Complex-Handwriting Movements Generation" Published 2016 (pp. 319-327), (Year: 2016).*

Rezende et al., ("Variational Learning for Recurrent Spiking Networks" Published 2021 (pp. 1-9) (Year: 2021).*

Maddison, Chris J., et al., "The Concrete Distribution: A Continuous Relaxation of Discrete Random Variables", arXiv preprint arXiv:1611.00712. Nov. 2, 2016, pp. 1-20.

Aenugu, Sneha., "Training Spiking Neural Networks Using Reinforcement Learning", arXiv preprint arXiv:2005.05941. May 12, 2020, pp. 1-33.

Lewis, P.A.W. et al., Simulation of Nonhomogeneous Poisson Processes by Thinning. Naval research logistics quarterly. Sep. 26, 1979, pp. 403-413.

Williams, Ronald J. "Simple Statistical Gradient-Following Algorithms for Connectionist Reinforcement Learning", Machine learning, 8. May 1, 1992, pp. 229-256.

Truccolo, Wilson, et al., "A Point Process Framework for Relating Neural Spiking Activity to Spiking History, Neural Ensemble, and Extrinsic Covariate Effects", Journal of neurophysiology 93. Sep. 8, 2004, pp. 1074-1089.

Lee, Chankyu, et al., "Enabling Spike-Based Backpropagation for Training Deep Neural Network Architectures", Frontiers in neuroscience, Atircle 119, vol. 14. Feb. 28, 2020, pp. 1-22.

Pfister, Jean-Pascal, et al., "Optimal Spike-Timing-Dependent Plasticity for Precise Action Potential Firing in Supervised Learning", Neural computation, 18, Massachusetts Institute of Technology. Jun. 2006, pp. 1318-1348.

Ogata, Yosihiko. "On Lewis' Simulation Method for Point Processes", IEEE transactions on information theory. Jan. 1981, pp. 23-31.

Anquetil, Lucas, "Wasserstein Learning of Determinantal Point Processes", arXiv preprint arXiv:2011.09712. Nov. 19, 2020, pp. 1-10.

Gerhard, Felipe et al., "On the Stability and Dynamics of Stochastic Spiking Neuron Models: Nonlinear Hawkes Process and Point Process GLMs", PLoS Computational Biology. Feb. 24, 2017, pp. 1-31.

Rezende, Danilo Jimenez., et al., "Stochastic Variational Learning in Recurrent Spiking Networks", Frontiers in Computational Neuroscience. Apr. 4, 2014, pp. 1-14.

Rezende, Danilo Jimenez., et al., "Variational Learning For Recurrent Spiking Networks", InNeural Information Processing Systems, 2011 (No. CONF).

Rasmussen, Jakob Gulddahl, "Lecture Notes: Temporal Point Processes and the Conditional Intensity Function", arXiv preprint arXiv:1806.00221. Jun. 1, 2018, pp. 1-19.

Mell et al., "The NIST Definition of Cloud Computing", National Institute of Standards and Technology, Special Publication 800-145, Sep. 2011, pp. 1-7.

* cited by examiner

200

Input: Conditional intensity function $\lambda(t \mid \mathcal{T}^{<t})$, upperbound $\bar{\lambda} \geq \|\lambda(t \mid \mathcal{T}^{<t})\|_1$, temperature $\tau > 0$, observation time window $T > 0$
Output: Realization of the differentiable point process $\mathcal{T}$ $\mathcal{S} \leftarrow \emptyset, \mathcal{T} \leftarrow \emptyset, k \leftarrow 1$
Repeat:
- Sample $s_k \sim \mathcal{PP}(\bar{\lambda} \mid \mathcal{S})$
- if $s_k > T$ then break
- Sample $\begin{bmatrix} p_k \\ r_k \end{bmatrix} \sim \text{Concrete}_\tau \left( \frac{1}{\bar{\lambda}} \begin{bmatrix} \lambda(s_k \mid \mathcal{T}) \\ \bar{\lambda} - \|\lambda(s_k \mid \mathcal{T})\|_1 \end{bmatrix} \right)$
- $\mathcal{T} \leftarrow \mathcal{T} \cup \{(s_k, p_k)\}$
- $\mathcal{S} \leftarrow \mathcal{S} \cup \{s_k\}$
- $k \leftarrow k + 1$ Return $\mathcal{T}$

FIG. 2

DIFFERENTIABLE TEMPORAL POINT PROCESSES FOR SPIKING NEURAL NETWORKS

BACKGROUND

The present invention generally relates to artificial intelligence, and more particularly to differentiable temporal point processes for spiking neural networks.

Temporal Point Processes (PPs) are used to model a sequence of events. For example, PPs can be used to model spike trains, that is, a sequence of spikes generated by neurons, Thus, PPs serve as a basis for a probabilistic model of spiking neural networks. As another example, PPs can be used to model events in social networks. In general, PPs can be specified by conditional intensity functions.

Partially-Observable Multivariate Point Processes (POMPPs) are used to increase expressiveness of temporal PPs. As example of a POMPP is spiking neural networks with hidden neurons.

Gradient descent of ELBO (Evidence Lower BOund) is known to be difficult to perform on temporal PPs and POMPPs using current methods. Hence, there is a need for a differentiable temporal point process for spiking neural networks, particularly one which readily allows gradient descent of ELBO to be determined.

SUMMARY

According to aspects of the present invention, a computer-implemented method is provided for performing a Differentiable Point Process (DPP) to train a probabilistic model of a probabilistic spiking neural network. The method includes (a) generating a first sample $s_k$ by sampling from a Poisson process with reference to an upper bound $\overline{\lambda}$ of a conditional intensity function representing the DPP given a first set of samples S. The method further includes (b) determining whether $s_k > T$, and proceeding to step (g) when $s_k > T$, and performing steps (c) through (f) and then returning to step (a) when $s_k \leq T$, where T denotes a length of observation specified by a user. The method also includes (c) generating a second sample $$\begin{bmatrix} p_k \\ r_k \end{bmatrix}$$

by sampling from a concrete distribution with reference to a parameter of the concrete distribution defined by the conditional intensity function and a temperature $\tau$, given a second set of samples $\mathcal{D}$. The method additionally includes (d) adding a pair of the first sample $s_k$ and a part of the second sample $p_k$ to the second set of samples $\mathcal{D}$ and discarding $r_k$. The method further includes (e) adding the first sample $s_k$ to the first set of samples S. The method also includes (f) updating k to k+1. The method additionally includes (g) outputting the second set of samples $\mathcal{D}$ as a differentiable realization of the DPP. The method further includes (h) training the probabilistic model using the second set of samples $\mathcal{D}$.

According to other aspects of the present invention, a computer program product is provided for performing a Differentiable Point Process (DPP) to train a probabilistic model of a probabilistic spiking neural network. The computer program product includes a non-transitory computer readable storage medium having program instructions embodied therewith, the program instructions executable by a hardware processor to cause the hardware processor to perform a method. The method includes (a) generating, by the hardware processor, a first sample $s_k$ by sampling from a Poisson process with reference to an upper bound $\overline{\lambda}$ of a conditional intensity function representing the DPP given a first set of samples S. The method further includes (b) determining, by the hardware processor, whether $s_k > T$, and proceeding to step (g) when $s_k > T$, and performing steps (c) through (f) and then returning to step (a) when $s_k \leq T$, where T denotes a length of observation specified by a user. The method also includes (c) generating, by the hardware processor, a second sample $$\begin{bmatrix} p_k \\ r_k \end{bmatrix}$$

by sampling from a concrete distribution with reference to a parameter of the concrete distribution defined by the conditional intensity function and a temperature $\tau$, given a second set of samples $\mathcal{D}$. The method additionally includes (d) adding, by the hardware processor, a pair of the first sample $s_k$ and a part of the second sample $p_k$ to the second set of samples $\mathcal{D}$ and discarding $r_k$. The method further includes (e) adding, by the hardware processor, the first sample $s_k$ to the first set of samples S. The method also includes (f) updating, by the hardware processor, k to k+1. The method additionally includes (g) outputting, by the hardware processor, the second set of samples $\mathcal{D}$ as a differentiable realization of the DPP. The method further includes (h) training the probabilistic model using the second set of samples $\mathcal{D}$.

According to yet other aspects of the present invention, a computer processing system is provided for performing a Differentiable Point Process (DPP) to train a probabilistic model of a probabilistic spiking neural network. The computer processing system includes a memory device for storing program code. The computer processing system further includes a hardware processor, operatively coupled to the memory device, for running the program code to (a) generate a first sample $s_k$ by sampling from a Poisson process with reference to an upper bound $\overline{\lambda}$ of a conditional intensity function representing the DPP given a first set of samples S. The hardware processor further runs the program code to (b) determine whether $s_k > T$, and proceeds to step (g) when $s_k > T$, and performs steps (c) through (f) and then returns to step (a) when $s_k \leq T$, where T denotes a length of observation specified by a user. The hardware processor also runs the program code to (c) generate a second sample $$\begin{bmatrix} p_k \\ r_k \end{bmatrix}$$

by sampling from a concrete distribution with reference to a parameter of the concrete distribution defined by the conditional intensity function and a temperature $\tau$, given a second set of samples $\mathcal{D}$. The hardware processor additionally runs the program code to (d) add a pair of the first sample $s_k$ and a part of the second sample $p_k$ to the second set of samples $\mathcal{D}$ and discard $r_k$. The hardware processor further runs the program code to (e) add the first sample $s_k$ to the first set of samples S. The hardware processor also runs the program code to (f) update k to k+1. The hardware processor additionally runs the program code to (g) output the second set of samples $\mathcal{D}$ as a differentiable realization of the DPP. The hardware processor further runs the program code to (h) train the probabilistic model using the second set of samples $\mathcal{D}$.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 2 is a diagram showing exemplary pseudocode, in accordance with an embodiment of the present invention;

DETAILED DESCRIPTION

Embodiments of the present invention are directed to differentiable temporal Point Processes (PPs) for spiking neural networks.

Embodiments of the present invention provide a reparameterization for temporal Point Processes for improved learning algorithms.

Embodiments of the present invention provide a sampling algorithm for temporal PPs whose output is differentiable with respect to model parameters. By having a differentiable output with respect to model parameters, embodiments of the present invention can be used with back propagation, in contrast to sampling algorithms that lack differentiable outputs with respect to model parameters.

Embodiments of the present invention applied to Monte Carlo gradient estimation yield a lower variance gradient estimate than conventional approaches such as REINFORCE estimator based approaches.

Embodiments of the present invention are particularly suitable for applications directed to training Spiking Neural Networks (SNNs). SNNs are neural networks where neurons communicate using spike trains. SNNs are expected to be more energy-efficient than the current neural networks especially when combined with neuromorphic chips. Embodiments of the present invention can be used to train a probabilistic model of SNNs more efficiently than the state-of-the-art methods, as readily appreciated by one of ordinary skill in the art given the teachings of the present invention provided herein.

Embodiments of the present invention are particularly suitable for applications directed to neuromorphic chips. Neuromorphic chips employ SNNs as the basis. Neuromorphic chips are often focused on inference (=prediction) capability, and are not equipped with learning capabilities. A conventional workaround is to convert a feed-forward neural network (not a SNN) into a SNN and send the SNN to the chip for inference, where the conversion is arbitrary and could incur information loss, leading to performance degradation. In contrast, SNNs trained by embodiments of the present invention are compatible with neuromorphic chips, and can avoid such information loss during conversion.

Figure 1:
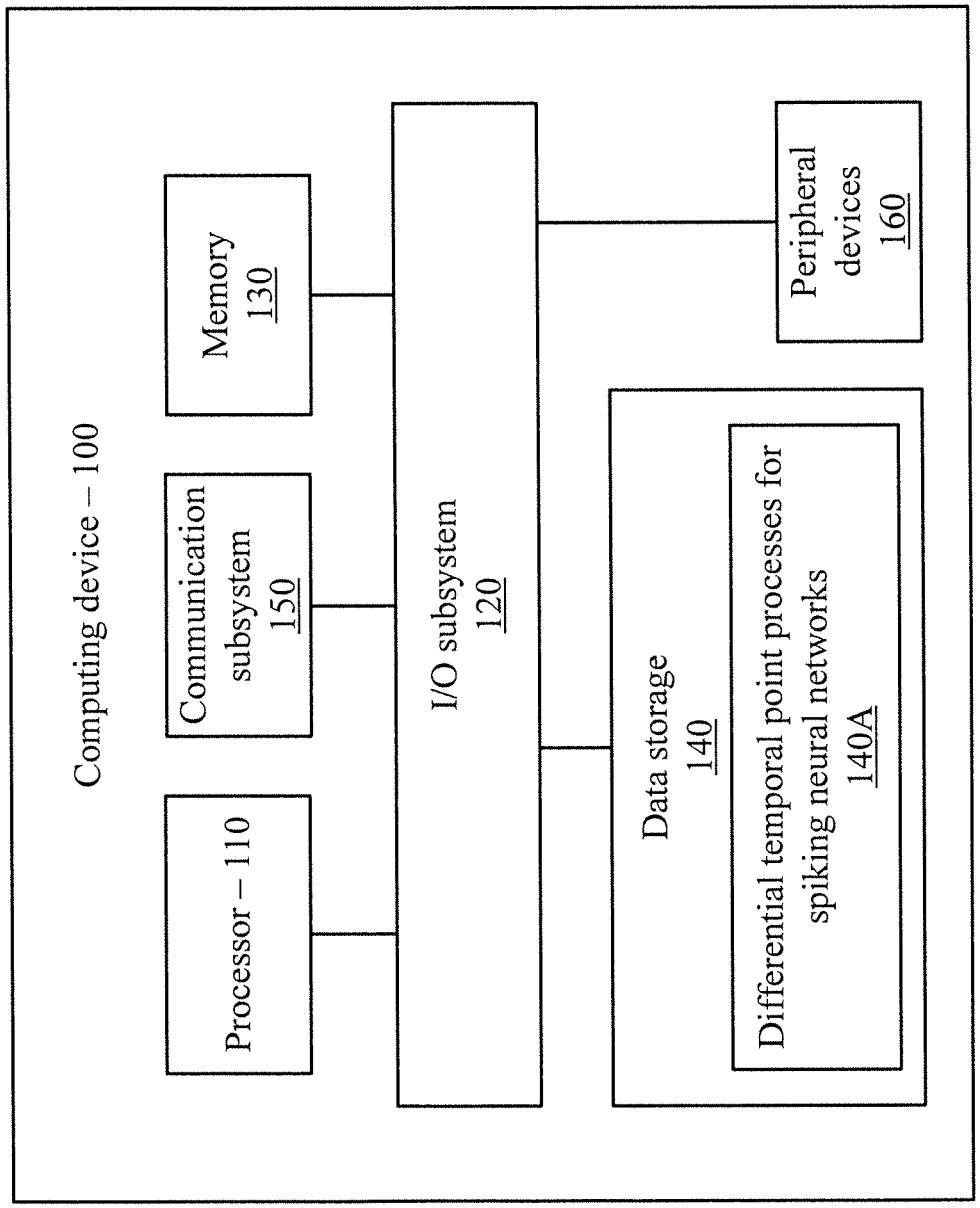
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform a differentiable temporal point process in a probabilistic spiking neural network.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for differentiable temporal point processes in spiking neural networks. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 7-8). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention FIG. 2 is a diagram showing exemplary pseudocode 200, in accordance with an embodiment of the present invention.

In FIG. 2, the following designations apply: Let $\mathcal{T} = \{t_n \in [0, T]\}_{n=1}^{N}$ be an observation of a temporal point process from time 0 to time T. Not only the event time stamp $t_n$ but also the number of events N are random variables. Let $\mathcal{PP}(\bar{\lambda} | \mathcal{T})$ be the Poisson process whose intensity equals to $\bar{\lambda} > 0$, conditioned on observation $\mathcal{T} = \{t_n\}_{n=1}^{N}$. A random sample from it is denoted by $t \sim \mathcal{PP}(\bar{\lambda} | \mathcal{T})$, where $t(\geq t_N)$ is the next event time stamp and $t - t_N$ is distributed according to the exponential distribution with parameter $\bar{\lambda}$. Let $1_d \in \{0,1\}^D$ be the D-dimensional one hot vector whose d-th element is equal to 1 and the other elements are 0. Let $\mathbb{1}^D = \{1_d \in \{0, 1\}^D\}_{d=1}^{D}$ be the set of all D-dimensional one hot vectors. Let $\mathcal{T}_D = \{(t_n, p_n) \in [0, T] \times \mathbb{1}^D\}_{n=1}^{N}$ be an observation of a D-dimensional point process from time 0 to time T, where $p_n = 1_d$ indicates that the n-th event occurs at time $t_n$ at the d-th dimension. Let $\mathcal{T}_D^{<t} = \{(t_n, p_n) \in \mathcal{T}_D | t_n < t\}$ be a partial sequence of $\mathcal{T}_D$ up to but not including time t. Let $\lambda_\theta(t, p | \mathcal{T}_D^{<t})$ ($p \in \mathbb{1}^D$) be the conditional intensity function of a multivariate point process with model parameter $\theta$. Let $\lambda_\theta(t | \mathcal{T}_D^{<t}) = [\lambda_\theta(t, p | \mathcal{T}_D^{<t})]_{p \in \mathbb{1}^D} \in \mathbb{R}^D$ be the vectorial representation of the conditional intensity functions. Letting $\|\lambda(t | \mathcal{T}_D^{<t})\|_1 = \Sigma_{p \in \mathbb{1}^D} \lambda(t, p | \mathcal{T}_D^{<t})$ be the sum of conditional intensity functions, let $\bar{\lambda}$ be an upperbound of $\|\lambda(t | \mathcal{T}_D^{<t})\|_1$. For any non-negative (D+1)-dimensional vector $\pi$ and any temperature parameter $\tau > 0$, let $\text{Concrete}_\tau(\pi)$ be the concrete distribution (also known as the Gumbel softmax distribution), and a random sampling from it is denoted by $$\begin{bmatrix} p \\ r \end{bmatrix}$$

$\sim \text{Concrete}_\tau(\pi)$, where $$\begin{bmatrix} p \\ r \end{bmatrix}$$

is a (D+1)-dimensional vector concatenating a D-dimensional vector p and a scalar r.

Figure 3:
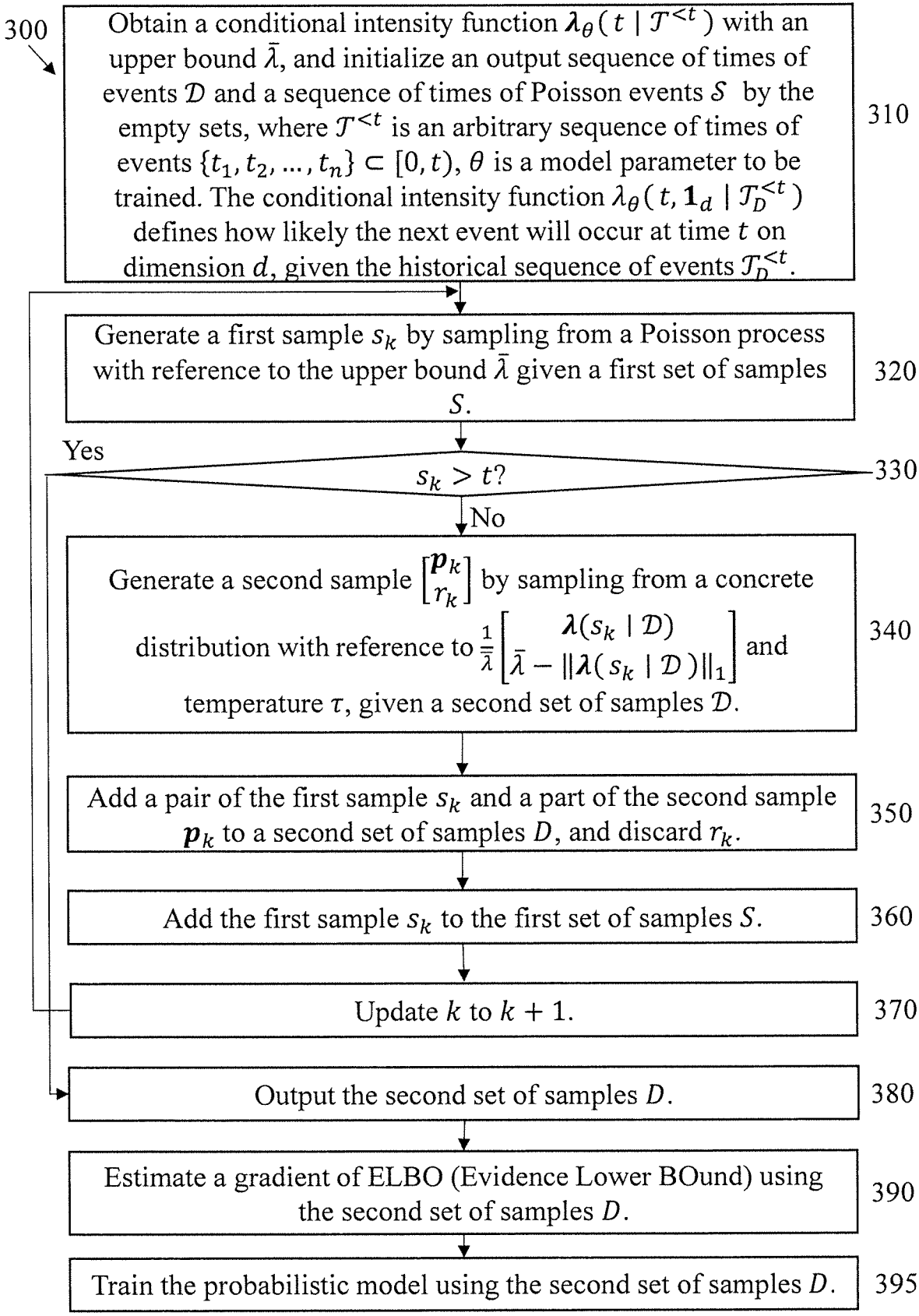
FIG. 3 shows an exemplary method for performing a Differentiable Point Process (DPP) to train a probabilistic model of a probabilistic spiking neural network, in accordance with an embodiment of the present invention.

A further description of the pseudocode 200 of FIG. 2 is presented with respect to method 300 described and shown with respect to FIG. 3.

FIG. 3 shows an exemplary method 300 for performing a Differentiable Point Process (DPP) to train a probabilistic model of a probabilistic spiking neural network, in accordance with an embodiment of the present invention.

At block 310, obtain a conditional intensity function $\lambda_\theta$ (t| $\mathcal{T}^{<t}$) with an upper bound $\bar{\lambda}$, and initialize an output sequence of times of events $\mathcal{D}$ and a sequence of times of Poisson events $\mathcal{S}$ by the empty sets, where $\mathcal{T}^{<t}$ is an arbitrary sequence of times of events $\{t_1, t_2, \ldots, t_n\} \subset [0, t)$, and $\theta$ is a model parameter to be trained. The conditional intensity function $\lambda_\theta(t, 1_d | \mathcal{T}_D^{<t})$ defines how likely the next event will occur at time t on dimension d, given the historical sequence of events $\mathcal{T}_D^{<T}$.

At block 320, generate a first sample $s_k$ by sampling from a Poisson process with reference to the upper bound $\bar{\lambda}$ given a first set of samples S. The sampling procedure is detailed as follows. Letting the latest time stamp in $\mathcal{S}$ be $s_{k-1}$ ($s_{k-1}=0$ if $\mathcal{S}$ is empty), the time interval between $s_{k-1}$ and $s_k$ is sampled from the exponential distribution with parameter $\bar{\lambda}$. $s_k$ is computed by adding the sampled time interval to $s_{k-1}$.

At block 330, determine whether $s_k > T$, where T denotes a length of observation specified by a user. If not, proceed to blocks 340 through 370 and then go back to block 320. Otherwise, proceed to block 380.

At block 340, generate a second sample $$\begin{bmatrix} p_k \\ r_k \end{bmatrix}$$

by sampling from a concrete distribution with reference to $$\frac{1}{\bar{\lambda}} \begin{bmatrix} \lambda(s_k|\mathcal{D}) \\ \bar{\lambda} - \|\lambda(s_k|\mathcal{D})\|_1 \end{bmatrix}$$

and temperature $\tau$, given a second set of samples $\mathcal{D}$. The second sample is a (D+1)-dimensional vector concatenating a D-dimensional vector $p_k$ and a scalar $r_k$. The sampling procedure is detailed as follows. Given a second set of samples $\mathcal{D}$, $\lambda(s_k|\mathcal{D})$ can be evaluated, which determines how likely an event occurs at time $s_k$ at each dimension. Given $\lambda(s_k|$ $$\mathcal{D}), \frac{1}{\bar{\lambda}} \begin{bmatrix} \lambda(s_k|\mathcal{D}) \\ \bar{\lambda} - \|\lambda(s_k|\mathcal{D})\|_1 \end{bmatrix}$$

can be computed, which is used as a parameter of the concrete distribution. Given the parameter and the temperature $\tau$, a second sample $$\begin{bmatrix} p_k \\ r_k \end{bmatrix}$$

is obtained from the concrete distribution configured with the parameter and temperature. The term "concrete distribution" refers to the Gumbel-Softmax distribution, which is a continuous distribution that approximates samples from a categorical distribution and also works with backpropagation. A concrete distribution can be considered a reparameterizable counterpart of Bernoulli/categorical distributions. The second sample $$\begin{bmatrix} p_k \\ r_k \end{bmatrix}$$

is a (D+1)-dimensional vector, whose first D elements correspond to $p_k$ and the last element to $r_k$. $r_k$ is always discarded and $p_k$ represents a "soft" event.

(1) For D=2, $p_k$ could be like, $p_k=[0.1, 0.6]$, which indicates that the event is associated to the first dimension by 10%, the second dimension by 60%, and the rest 30% are discarded.

(2) In the existing formulation, $p_k$ was a one-hot vector like, $p_k=[1, 0]$, which indicates that the event is associated to the first dimension. Sometimes $p_k=[0, 0]$, which indicates that the event candidate is discarded.

At block 350, add a pair of the first sample $s_k$ and a part of the second sample $p_k$ to a second set of samples $\mathcal{D}$, and discard $r_k$.

At block 360, add the first sample $s_k$ to the first set of samples S.

At block 370, update k to k+1.

At block 380, output the second set of samples $\mathcal{D}$.

The second set of samples $\mathcal{D}$ is a differentiable realization of a multivariate point process. In specific, if the conditional intensity function $\lambda(t|\mathcal{T}^{<t})$ is parameterized by $\theta$, each $p_k$ in $\mathcal{D}$ is differentiable with respect to $\theta$. This enables us to backpropagate errors, which is necessary to learn the model parameter $\theta$ from data.

At block 390, estimate a gradient of ELBO (Evidence Lower BOund) using the second set of samples D. With the differentiable realization $\mathcal{D}$, the gradient of ELBO with respect to the model parameter $\theta$ can be computed by backpropagating errors. Without this invention, errors cannot be backpropagated because a realization of a multivariate point process is not differentiable.

At block 395, train the probabilistic model using the second set of samples $\mathcal{D}$.

Figure 4:
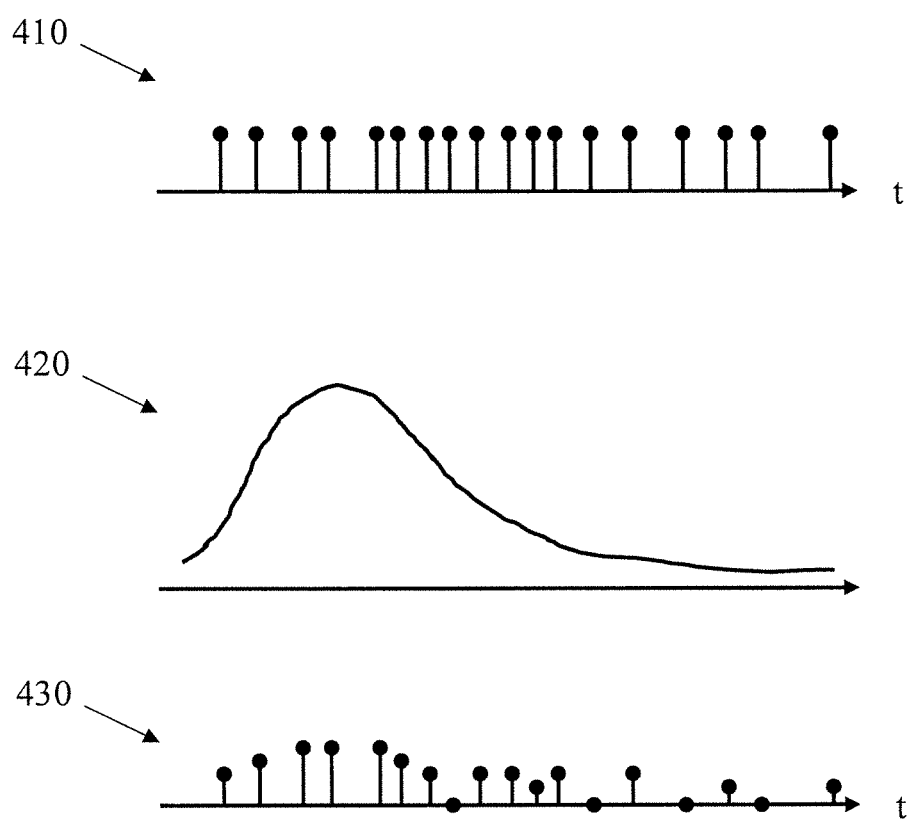
FIG. 4 is a diagram showing an illustration of a differentiable temporal point process, in accordance with an embodiment of the present invention.

FIG. 4 is a diagram showing an illustration of a differentiable temporal point process in the case of dimension D=1, 400, in accordance with an embodiment of the present invention.

The differentiable point process 400 includes a Poisson point process portion 410, a conditional intensity function portion 420, and a differentiable temporal point process portion 430. Each of the portions is represented on the real timeline with the x axis denoting time and the Y axis denoting amplitude.

The Poisson point process portion 410 involves a Poisson point process. A Poisson point process is a random mathematical object that consists of points randomly located on a mathematical space. The Poisson point process is often defined on the real timeline (as shown here), where it can be considered as a stochastic process. Point processes on the real timeline form an important special case that is particularly amenable to study because the points are ordered in a natural way, and the whole point process can be described completely by the (random) intervals between the points.

The conditional intensity function portion 420 involves a conditional intensity function. The conditional intensity function is a representation of a point process to be simulated. In the case of dimension D=1, the conditional intensity function is a function defined over time; in the multivariate case (D≥2), the conditional intensity function is a function of time and dimension, which is represented by a one-hot vector $1_d$ (d=1, ..., D). The x axis denotes time and the Y axis denotes the value of the conditional intensity function.

The differentiable temporal point process portion 430 involves a differentiable temporal point process wherein each event is associated with a real value in [0, 1].

Figure 5:
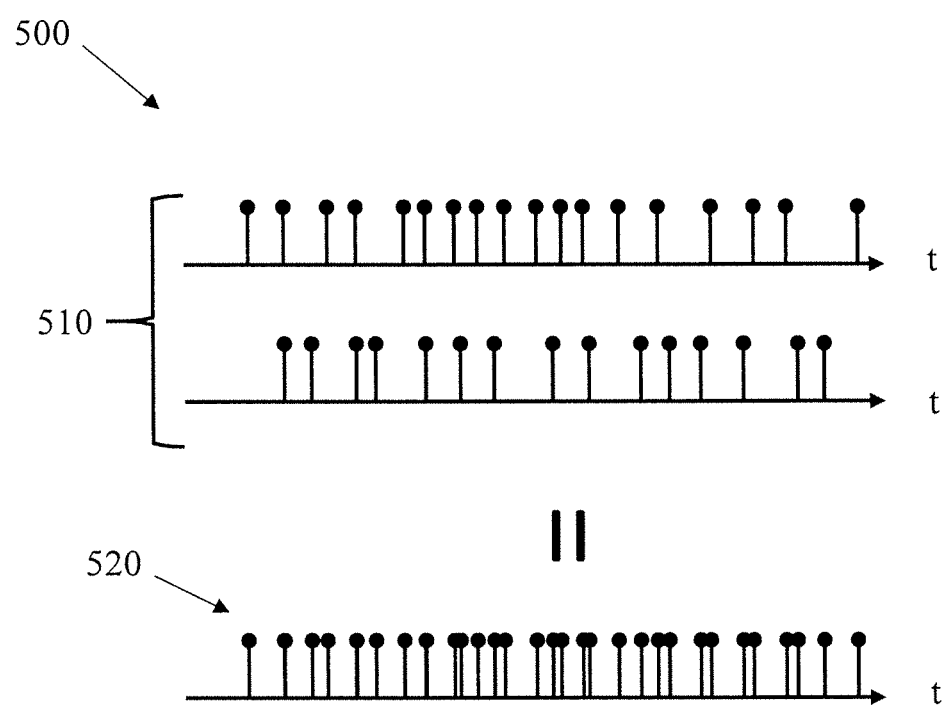
FIG. 5 is a diagram showing a multivariate case extension, in accordance with an embodiment of the present invention.

FIG. 5 is a diagram showing a multivariate case extension 500, in accordance with an embodiment of the present invention.

In the multivariate case extension 500, a multivariate point process is considered to be a marked point process 510, which means a point process in which some additional features (marks) are measured at each point. The marks form a collection of independent and identically distributed non-negative random variables 520. Each of the marks can be a respective vector in a D-dimensionality one-hot vector in the case of a multivariate point process and D-dimensionality sub-probability vector in the case of a differentiable point process.

The multivariate case extension 500 uses a multivariate concrete distribution to make the point process differentiable.

Figure 6:
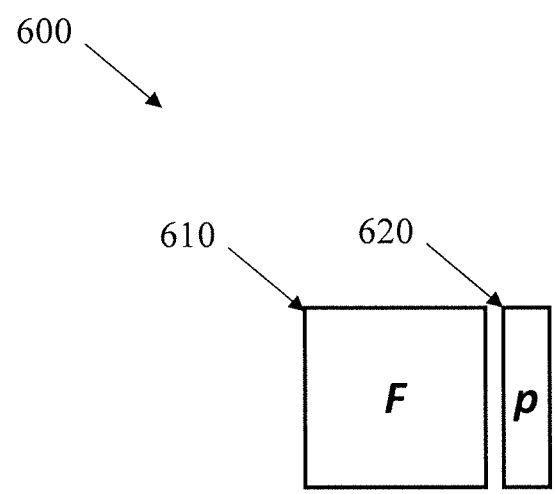
FIG. 6 is a diagram showing an application of the present invention to spiking neural networks, in accordance with an embodiment of the present invention.

FIG. 6 is a diagram showing an application 600 of the present invention to Spiking Neural Networks (SNNs), in accordance with an embodiment of the present invention.

The application 600 involves a differentiable spiking neural network.

A Spiking Neural Network (SNN) is an artificial neural network that more closely mimics natural neural networks. In addition to neuronal and synaptic state, SNNs incorporate the concept of time into their operating model. The idea is that neurons in the SNN do not transmit information at each propagation cycle (as it happens with typical multi-layer perceptron networks), but rather transmit information only when a membrane potential (an intrinsic quality of the neuron related to its membrane electrical charge) reaches a specific value, called the threshold. When the membrane potential reaches the threshold, the neuron fires, and generates a signal that travels to other neurons which, in turn, increase or decrease their potentials in response to this signal. A neuron model that fires at the moment of threshold crossing is also called a spiking neuron model. Another neuron model fires in a stochastic manner; its firing probability is proportional to the membrane potential. The output of a single neuron is called a spike train, and it is modeled by a temporal point process if the neuron is stochastic. The output of SNN that consists of multiple neurons is modeled by a multivariate point process. The outputs of some of the neurons are unobservable, and such neurons are called hidden neurons. A differentiable SNN differs from a conventional SNN in that the outputs are differentiable with respect to model parameters, thus allowing for gradient descent which is not possible with non-differentiable outputs with respect to model parameters.

The application 600 is applied to a membrane potential 610 involving a weight function $F_{ij}(t)$ 610 and a n-th soft spike $p_n$ 620.

The membrane potential is denoted by the following:

$$u(t|\mathcal{T}^{<t}) = \bar{u} + \sum_{n=1}^{N(t)} F(t-\tau_n) p_n$$

where $$\mathcal{T}^{<t} = \{(\tau_n, p_n) \in \mathbb{R} \times \Delta^D\}_{n=1}^{N(t)}$$

$\tau_n$: the n-th spiking time $p_n$: the n-th soft spike, represented by a vector such that $p_n \geq 0$, $1^T p_n \leq 1$ (restricting $p_n$ to one-hot vectors recovers the original spiking neural networks)

$F_{ij}(t)$: weight function from neuron j to neuron i, time t after neuron j spikes $\bar{u} \in \mathbb{R}^D$: bias The conditional intensity function is as follows:

$$\lambda(t|\mathcal{T}^{<t}) = \sigma(u(t|\mathcal{T}^{<t}))$$

where $\sigma: \mathbb{R}^D \to \mathbb{R}^D$ an arbitrary monotonically increasing function with upperbound (e.g., sigmoid function).

A description will now be given regarding a reparameterization technique, in accordance with an embodiment of the present invention.

Objective function: Negative ELBO $$\mathcal{L}(\theta, \phi) = \mathbb{E}_{q(\mathcal{T}_H; \phi)}[-\log p(\mathcal{T}_O, \mathcal{T}_H; \theta) + \log q(\mathcal{T}_H; \phi)]$$

where $\mathcal{T}_O$: spike train from observable neurons $\mathcal{T}_H$: spike train from hidden neurons $D_O$: the number of observable neurons $D_H$: the number of hidden neurons $\mathcal{O} = \{1_d \in \mathbb{I}^{D_O+D_H} | d=1, \ldots, D_O\}$: the set of observable neurons represented by $(D_O+D_H)$-dimensional one-hot vectors.

$\mathcal{H} = \{1_d \in \mathbb{I}^{D_O+D_H} | d=D_O+1, \ldots, D_O+D_H\}$: the set of hidden neurons represented by $(D_O+D_H)$-dimensional one-hot vectors.

$p(\mathcal{T}_O, \mathcal{T}_H; \theta)$: a probability density function of SNN parameterized by $\theta$, whose spike train from observable neurons is $\mathcal{T}_O$ and spike train from hidden ones is $\mathcal{T}_H$. This is modeled by a multivariate point process, whose intensity function is defined by $\lambda_\theta(t|\mathcal{T}^{<t}) = [\lambda_\theta(t, p|\mathcal{T}^{<t})]_{p \in \mathcal{O} \cup \mathcal{H}}$ (see [0061]).

$q(\mathcal{T}_H; \phi)$: a probability density function of a variational distribution parameterized by $\phi$, which is used to approximate the posterior distribution of the hidden spike train given the observable spike train, namely, $p(\mathcal{T}_H|\mathcal{T}_O; \theta)$. This is modeled by a multivariate point process, whose intensity function is defined by $\lambda_\phi(t|\mathcal{T}^{<t}) = [\lambda_\phi(t, p|\mathcal{T}^{<t})]_{p \in \mathcal{H}}$.

An embodiment of $\lambda_q(t|\mathcal{T}^{<t})$ is to set $\lambda_\phi(t, p|\mathcal{T}^{<t}) = \lambda_\theta(t, p|\mathcal{T}^{<t})$.

$\mathbb{E}_{q(\mathcal{T}_H; \phi)}$: expectation operator, which takes the expectation with respect to $\mathcal{T}_H$ which is distributed according to $q(\mathcal{T}_H; \phi)$ Reparameterization Technique (1) Sample $\mathcal{T}_H$ from a differentiable point process with the conditional intensity function $\lambda_q(t|\mathcal{T}^{<t})$.

(2) Compute and differentiate $\ell$ with respect to $\theta$ and $\phi$ to compute gradients:

$$\ell(\theta, \phi; \mathcal{T}_H) = -\log p(\mathcal{T}_O, \mathcal{T}_H; \theta) + \log q(\mathcal{T}_H; \phi)$$

A description will now be given regarding annealing for $\tau$, in accordance with an embodiment of the present invention.

$\tau$ relates to the temperature parameter of the concrete distribution.

The larger $\tau$ is, the soft spike becomes softer, and the learned parameter is difficult to transfer into the hard SNN.

The smaller $\tau$ is, then the soft spike becomes harder and gets close to one-hot vectors, but the backpropagation does not propagate errors well and becomes inefficient.

Proposed method: $\tau$-annealing for a Differentiable PP

Exponential annealing for $\tau$:

$$\tau(t) = \tau_0 \cdot r^t$$

where $\tau_0 > 0$ is an initial temperature, $r \in (0,1)$ is a discounting factor, and $t > 0$ is the number of iterations.

Configuration $\tau_0 = 1.0$ $r = 0.75$ $\tau(10) = 0.0563$

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
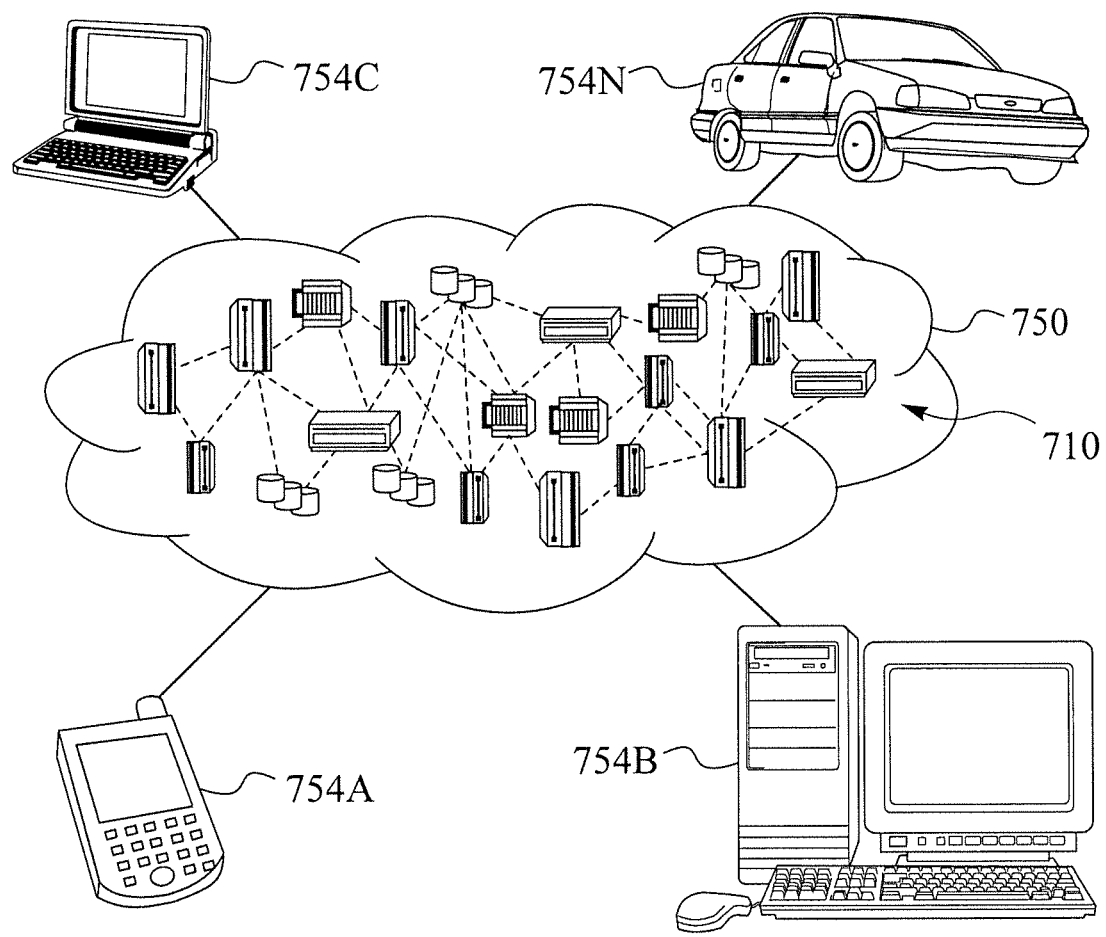
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
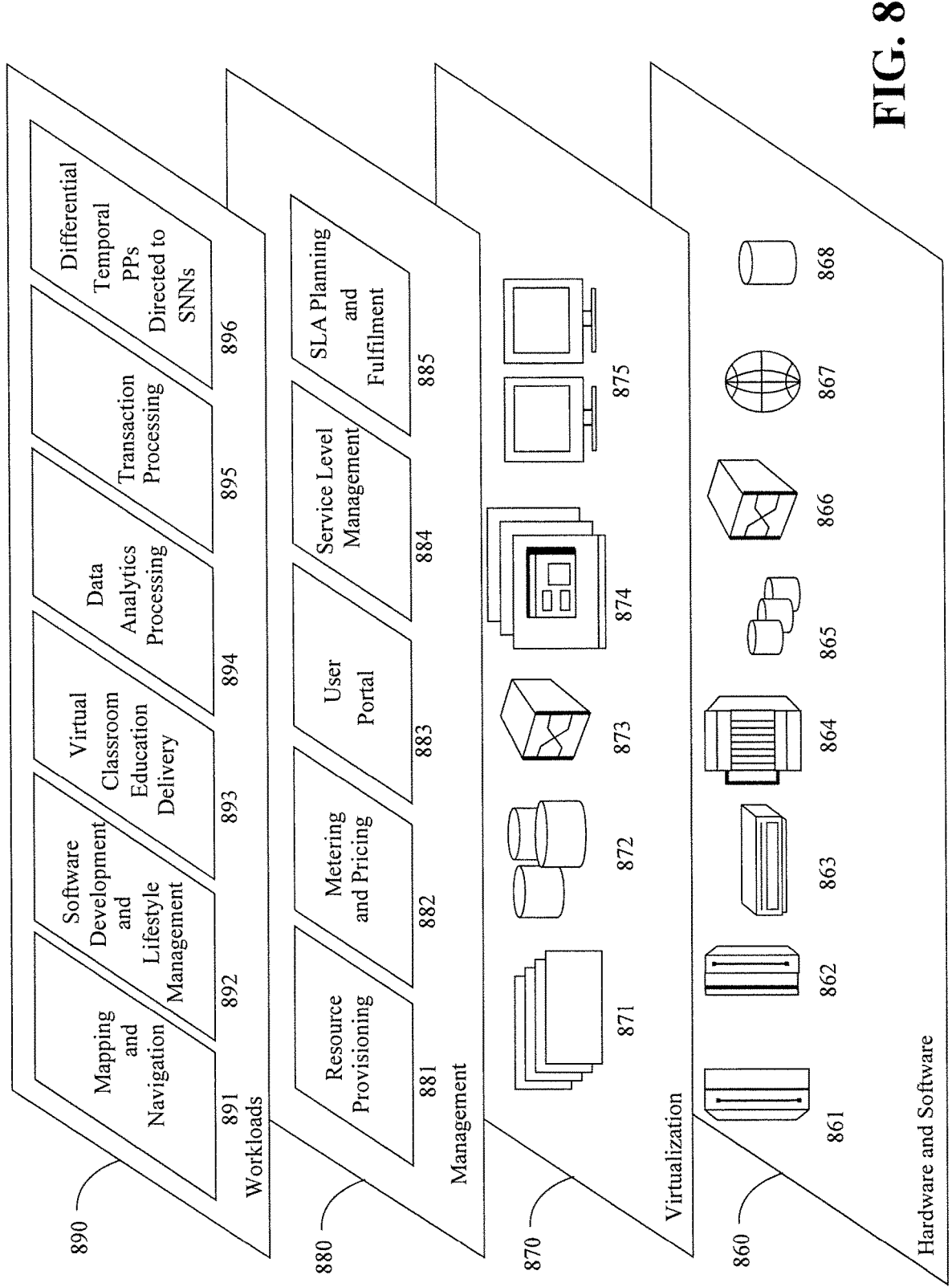
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and differentiable temporal Point Processes (PPs) directed to Spiking Neural Networks (SNNs). 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for performing a Differentiable Point Process (DPP) to train a probabilistic model of a probabilistic spiking neural network, comprising:
   (a) generating a first sample $s_k$ by sampling from a Poisson process with reference to an upper bound $\overline{\lambda}$ of a conditional intensity function representing the DPP given a first set of samples S;
   (b) determining whether $s_k > T$, and proceeding to step (g) when $s_k > T$, and performing steps (c) through (f) and then returning to step (a) when $s_k \leq T$, where T denotes a length of observation specified by a user;
   (c) generating a second sample
   $$\begin{bmatrix} p_k \\ r_k \end{bmatrix}$$
   by sampling from a concrete distribution with reference to a parameter of the concrete distribution defined by the conditional intensity function and a temperature $\tau$, given a second set of samples D;
   (d) adding a pair of the first sample $s_k$ and a part of the second sample $p_k$ to the second set of samples D and discarding $r_k$;
   (e) adding the first sample $s_k$ to the first set of samples S;
   (f) updating k to k+1;
   (g) outputting the second set of samples D as a differentiable realization of the DPP; and
   (h) training the probabilistic model using the second set of samples D to allow gradient descent for the probabilistic spiking neural network.

2. The computer-implemented method of claim 1, further comprising estimating a gradient of ELBO (Evidence Lower BOund) using the second set of samples D.

3. The computer-implemented method of claim 1, further comprising learning the probabilistic model with a better weight transfer capability from a differentiable model into non-differentiable model by reducing the temperature t during model training than when the temperature $\tau$ is maintained.

4. The computer-implemented method of claim 1, further comprising restricting a soft spike of the probabilistic Spiking Neural Network to a one hot vector.

5. The computer-implemented method of claim 1, wherein the differentiable point process is a multivariate point process.

6. The computer-implemented method of claim 5, wherein the multivariate point process involves a plurality of marks, each in a respective vector in a K-dimensional probability vector, where K is an integer greater than 1.

7. The computer-implemented method of claim 1, wherein the method is applied to a Monte Carlo gradient estimation training technique.

8. The computer-implemented method of claim 1, wherein generating a first sample $s_k$ comprises, sampling a time interval between $s_{k-1}$ and $s_k$ from an exponential distribution with parameter $\overline{\lambda}$, wherein $s_k$ is computed by adding the sampled time interval to $s_{k-1}$.

9. The computer-implemented method of claim 1, wherein the second sample is a (D+1)-dimensional vector concatenating a D-dimensional vector $p_k$ and a scalar $r_k$.

10. The computer-implemented method of claim 1, wherein each of the second samples $p_k$ is differentiable with respect to the model parameter to be trained.

11. The computer-implemented method of claim 1, further comprising calculating a backpropagation error on the differentiable realization of the DPP.

12. A computer program product for performing a Differentiable Point Process (DPP) to train a probabilistic model of a probabilistic spiking neural network, the computer program product comprising a non-transitory computer readable storage medium having program instructions embodied therewith, the program instructions executable by a hardware processor to cause the hardware processor to perform a method comprising:
   (a) generating, by the hardware processor, a first sample $s_k$ by sampling from a Poisson process with reference to an upper bound $\bar{\lambda}$ of a conditional intensity function representing the DPP given a first set of samples S;
   (b) determining, by the hardware processor, whether $s_k > T$, and proceeding to step (g) when $s_k > T$, and performing steps (c) through (f) and then returning to step (a) when $s_k \leq T$, where T denotes a length of observation specified by a user;
   (c) generating, by the hardware processor, a second sample
   $$\begin{bmatrix} p_k \\ r_k \end{bmatrix}$$
   by sampling from a concrete distribution with reference to a parameter of the concrete distribution defined by the conditional intensity function and a temperature $\tau$, given a second set of samples D;
   (d) adding, by the hardware processor, a pair of the first sample $s_k$ and a part of the second sample $p_k$ to the second set of samples D and discarding $r_k$;
   (e) adding, by the hardware processor, the first sample $s_k$ to the first set of samples S;
   (f) updating, by the hardware processor, k to k+1;
   (g) outputting, by the hardware processor, the second set of samples D as a differentiable realization of the DPP; and
   (h) training the probabilistic model using the second set of samples D to allow gradient descent for the probabilistic spiking neural network.

13. The computer program product of claim 12, wherein the method further comprises estimating a gradient of ELBO (Evidence Lower BOund) using the second set of samples D.

14. The computer program product of claim 12, wherein the method further comprises learning the probabilistic model with a better weight transfer capability from a differentiable model into non-differentiable model by reducing the temperature t during model training than when the temperature $\tau$ is maintained.

15. The computer program product of claim 12, wherein the method further comprises restricting a soft spike of the probabilistic Spiking Neural Network to a one hot vector.

16. The computer program product of claim 12, wherein the differentiable point process is a multivariate point process.

17. The computer program product of claim 16, wherein the multivariate point process involves a plurality of marks, each in a respective vector in a K-dimensional probability vector, where K is an integer greater than 1.

18. The computer program product of claim 12, wherein the method is applied to a Monte Carlo gradient estimation training technique.

19. The computer program product of claim 12, wherein generating a first sample $s_k$ comprises, sampling a time interval between $s_{k-1}$ and $s_k$ from an exponential distribution with parameter $\bar{\lambda}$, wherein $s_k$ is computed by adding the sampled time interval to $s_{k-1}$.

20. A computer processing system for performing a Differentiable Point Process (DPP) to train a probabilistic model of a probabilistic spiking neural network, comprising:
   a memory device for storing program code; and
   a hardware processor, operatively coupled to the memory device, for running the program code to:
      (a) generate a first sample $s_k$ by sampling from a Poisson process with reference to an upper bound $\bar{\lambda}$ of a conditional intensity function representing the DPP given a first set of samples S;
      (b) determine whether $s_k > T$, and proceed to step (g) when $s_k > T$, and perform steps (c) through (f) and then return to step (a) when $s_k \leq T$, where T denotes a length of observation specified by a user;
      (c) generate a second sample
      $$\begin{bmatrix} p_k \\ r_k \end{bmatrix}$$
      by sampling from a concrete distribution with reference to a parameter of the concrete distribution defined by the conditional intensity function and a temperature $\tau$, given a second set of samples D;
      (d) add a pair of the first sample $s_k$ and a part of the second sample $p_k$ to the second set of samples D and discard $r_k$;
      (e) add the first sample $s_k$ to the first set of samples S;
      (f) update k to k+1; and
      (g) output the second set of samples D as a differentiable realization of the DPP,
      (h) train the probabilistic model using the second set of samples D to allow gradient descent for the probabilistic spiking neural network.

* * * * *